United States Patent [19]

Dittmer

[11] Patent Number: 5,551,658
[45] Date of Patent: Sep. 3, 1996

[54] PROJECTOR LIFT SYSTEM

[75] Inventor: Jay S. Dittmer, Burnsville, Minn.

[73] Assignee: Chief Manufacturing, Inc., Burnsville, Minn.

[21] Appl. No.: 290,689

[22] Filed: Aug. 15, 1994

[51] Int. Cl.⁶ ..................................................... A47F 5/00
[52] U.S. Cl. ........................................................ 248/329
[58] Field of Search ................................. 248/329, 324, 248/330.1; 352/242, 243; 254/362

[56] References Cited

U.S. PATENT DOCUMENTS

| | | | |
|---|---|---|---|
| 322,515 | 7/1885 | Young | 248/329 |
| 326,364 | 9/1885 | Weston | 248/329 |
| 936,681 | 10/1909 | Union . | |
| 1,819,516 | 8/1931 | Kelly . | |
| 1,964,339 | 6/1934 | Brassell | 296/19.5 |
| 2,435,755 | 2/1948 | Schimpff | 186/1 |
| 2,933,198 | 4/1960 | Firestone et al. | 212/128 |
| 3,032,308 | 5/1962 | Hansen | 248/329 |
| 3,457,006 | 7/1969 | Brown et al. | 352/132 |
| 3,759,475 | 9/1973 | Brown | 248/277 |
| 4,060,292 | 11/1977 | Medina | 312/247 |
| 4,093,364 | 6/1978 | Miller | 352/132 |
| 4,160,999 | 7/1979 | Claggett | 352/242 X |
| 4,225,881 | 9/1980 | Toui | 352/242 X |
| 4,313,208 | 1/1982 | Kavenik . | |
| 4,412,601 | 11/1983 | Cooper | 187/27 |
| 4,577,827 | 3/1986 | Eliscu | 248/656 |
| 4,750,832 | 6/1988 | Lioyd, Sr. et al. . | |
| 4,764,008 | 8/1988 | Wren | 352/243 X |
| 4,830,147 | 5/1989 | Kawada | 187/8.62 |
| 4,843,782 | 7/1989 | Gustaveson et al. . | |
| 4,941,718 | 7/1990 | Alexander, III et al. | 312/312 |
| 4,978,984 | 12/1990 | Brookfield | 352/242 X |
| 5,037,059 | 8/1991 | Asano | 248/330.1 |
| 5,240,220 | 8/1993 | Eberbaum | 352/243 X |
| 5,261,645 | 11/1993 | Huffman . | |
| 5,310,152 | 5/1994 | O'Neill | 248/324 |
| 5,366,203 | 11/1994 | Huffman | 254/362 |

FOREIGN PATENT DOCUMENTS

| | | | |
|---|---|---|---|
| 1216812 | 1/1960 | France . | |
| 3120938 | 2/1982 | Germany | 248/330.1 |

OTHER PUBLICATIONS

"Projector Lifts" from SVS Inc., eight page product catalog by Daniels Publishing Group, Inc. (1995).
"Taking Video Projection to New Heights," two sheets by Display Devices, Inc.
"Control Systems for Video Projector Lifts," three sheets by Draper Shade & Screen Co., Inc. © 1994.
"Video Projector Lift Models VPL-20 and VPL-16," two sheets by Stewart Filmscreen Corporation © 1991.
"Da-Lift Video Projector Lift" specification data sheet, Da-Lite Screen Company, Inc. (one page).

Primary Examiner—Alvin C. Chin-Shue
Assistant Examiner—Sarah L. Purol
Attorney, Agent, or Firm—Mueting, Raasch, Gebhardt & Schwappach P.A.

[57] ABSTRACT

A ceiling mounted projector lift system for moving audio/visual equipment between a lowered position and an operating position secured to projector lift.

22 Claims, 5 Drawing Sheets

PROJECTOR LIFT SYSTEM

BACKGROUND OF THE INVENTION

1. Field of the Invention

The present invention relates to an apparatus for raising and lowering an audio/visual device, and for securing the device to the ceiling, and more particularly, to a ceiling mounted projector lift system for moving an audio/visual device between an operating position rigidly secured to the projector lift and a lowered position.

2. Description of the Related Art

Various types of ceiling mounted audio/visual equipment, such as television projectors or computer display projectors, are available for used in theaters, auditoriums and presentation rooms. These projectors must be located close to the screen in order to minimize distortion at the perimeter of the projection screen. Therefore, rather than locating the projector in the middle of the room, partially obstructing the screen, it is often desirable to suspend it from the ceiling.

Various lifting devices have been developed for concealing projectors in the ceiling when not in use, and for lowering the equipment into an operating position in the room. U.S. Pat. No. 5,261,645 issued to Huffman discloses a projector ceiling lift which utilizes a pair of cables for raising and lowering the projector between an operating position and a storage position concealed in the ceiling. A pair of accordion stabilizer mechanisms to give the video projector additional stability when in the lowered position. However, the device of Huffman is designed for use in an environment where there is sufficient space between the ceiling support structure of the building and a suspended ceiling. Also, the stabilizing mechanisms of Huffman are more susceptible to vibration than a rigid mounting structure, especially when used with current high resolution video projectors. Additionally, Huffman relies entirely on the cables for supporting the audio/visual equipment in both the operating and lowered positions.

U.S. Pat. No. 4,750,832 issued to Lloyd, Sr. et al. discloses a video projector mount which moves the projector from a concealing position in the ceiling to an operating position within the room. Lloyd is designed for installation between the support ceiling and the suspended ceiling. Additionally, the projector mount of Lloyd is not capable of lowering the projector to the floor for maintenance. Consequently, installation and maintenance of the projector is more difficult and expensive.

SUMMARY OF THE INVENTION

The present invention is directed to a ceiling mount projector lift system for moving audio/visual equipment between an operating position rigidly secured to the projector lift system and a lowered position for installation and maintenance.

A motorized winch assembly is retained in a housing attached to the ceiling. The winch assembly has at least one cable cylinder for winding and unwinding a cable disposed on the cylinder. An equipment mounting adapter is connected to the distal end of the cable for retaining the audio/visual equipment. A locking latch assembly is provided for releasably connecting the equipment mounting adapter rigidly to the housing so that the audio/visual equipment is retained to the ceiling when in the raised position. A switch mechanism may be provided for interrupting power to the motorized winch assembly when the locking latch assembly is engaged.

The housing preferably includes a ceiling pole mount assembly for receiving a threaded pipe attached to the ceiling. The ceiling pole mount assembly permits adjustment of the yaw of the audio/visual equipment. A setscrew is provided on the ceiling pole mount assembly for retaining the audio/visual equipment in a particular location. The housing also preferably includes a plurality of slotted openings for adjusting the pitch and a height adjustment bolt for adjusting the roll of the audio/visual equipment.

A preferred embodiment of the motorized winch assembly includes at least one electric motor engaged with the cable cylinder. A first capacitor is connected to the electric motor for unwinding the cable from the cable cylinder. A second capacitor is combined with the first capacitor to provide additional power to the electric motor for winding the cable onto the cable cylinder so that heat generation by the motor is minimized.

A floating pinch roller is provided for engagement with the cable cylinder. In a preferred embodiment, the pinch roller is driven by the electric motor only during unwinding of the cable. The pinch roller preferably is disposed at an angle relative to the cable cylinder so that it engages with the leading edge of the cable winding proximate the location where the cable disengages the cable cylinder during unwinding.

A cable guide assembly may be provided for uniformly winding and unwinding the cable from the cable cylinder. In the preferred embodiment, the cable guide assembly is synchronized with the electric motor.

In an alternate embodiment, first and second electric motors are provided for engagement with first and second cable cylinders, respectively. Each electric motor preferably has sufficient lifting capacity to move the audio/visual equipment between the operating position secured to the ceiling and the lowered position. The first and second cable cylinders preferably each have a pinch roller and a cable guide assembly for uniformly winding and unwinding the cable onto the respective cylinders.

In the preferred embodiment, the first and second electric motors are synchronized so that the rotation of the first and second cylinders is synchronized.

In a preferred embodiment, a switch is provided for interrupting power to the electric motors when the unwinding of the cable is complete.

The electric motors preferably include an internal brake for preventing rotation of the motors if the electric power fails. In a preferred embodiment, the motor shaft is biased in a first direction so that a friction pad attached to the motor shaft engages with the motor housing. When electric current is provided to the motor, the inductive force overcomes the biasing force to shift the motor shaft in the opposite direction, such that the friction pad is disengaged from the motor housing. An external brake assembly may also be included for supplementing the biasing force in the motor of the friction pad against the motor housing.

DETAILED DESCRIPTION OF THE PREFERRED EMBODIMENT

Figure 1:
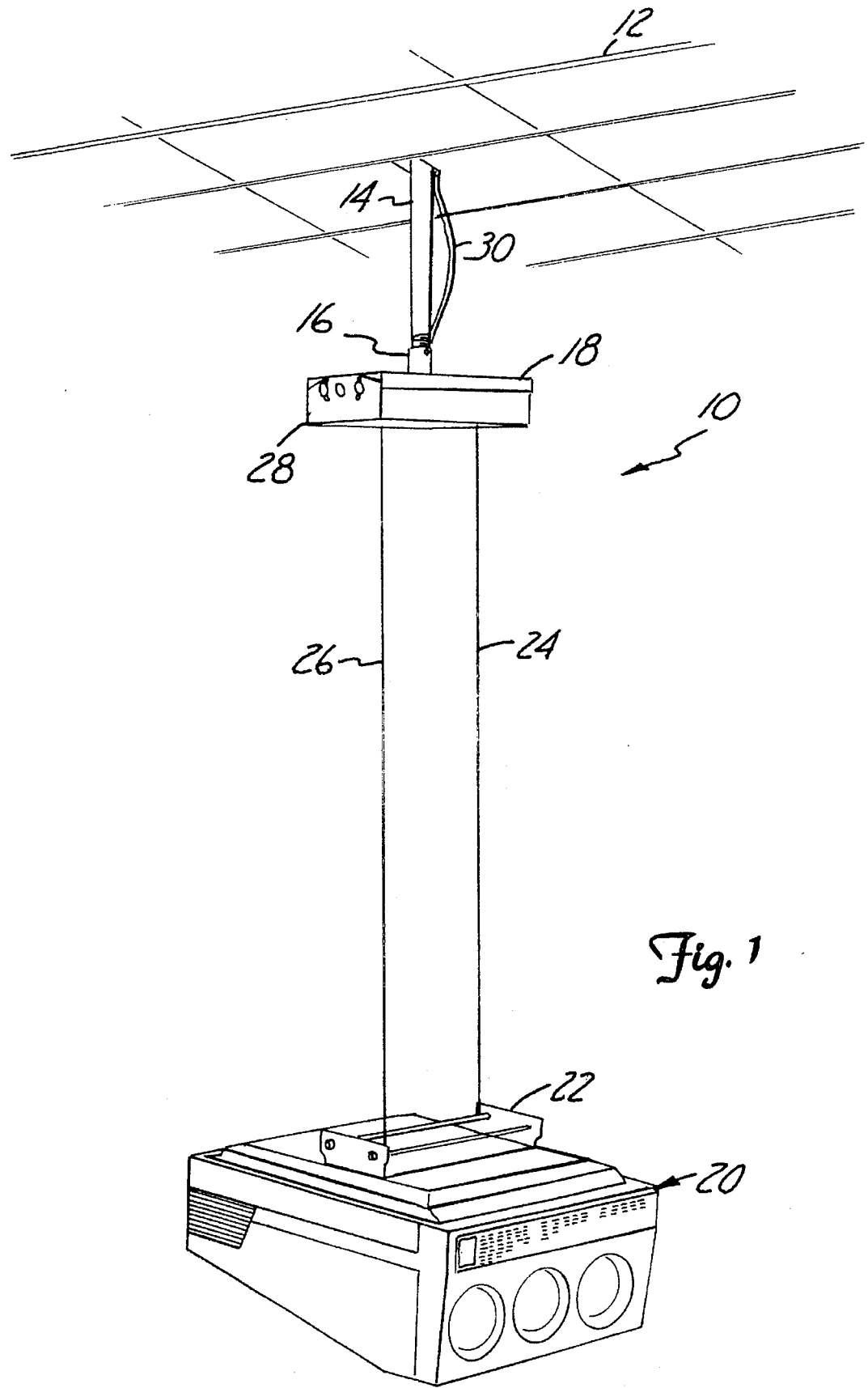
FIG. 1 is a perspective view of an exemplary audio/visual projector and the present projector lift in the lowered position.

FIG. 1 is a perspective view of a preferred projector lift 10 mounted to a ceiling 12 by a threaded mounting pipe 14. A ceiling pole mount 16 is provided on a cover 18 for engagement with the threaded portion of the pipe 14. The other end of the pipe 14 is attached to the ceiling 12 by conventional means.

FIG. 1 illustrates an exemplary audio/visual projector 20 in a lowered position, attached to an equipment mounting adapter 22. Projectors of the type illustrated in FIG. 1 can range anywhere from 200 to 400 pounds. The lowered position is primarily for installation and maintenance of the projector 20. Cables 24, 26 extend between the equipment mounting adapter 22 and a housing 28 on the projector lift 10. A power cord 30 connected to a power source (not shown) provides electric power to the projector lift 10. As will be explained in more detail below, the equipment mounting adapter 22 is securely attached to the housing 28 in the operating position to isolate the projector 20 from environmental vibrations and for increased safety. Finally, it will be understood that the present projector lift 10 is suitable for use with a wide variety of audio/visual devices, such as for example television receivers, movie or slide projectors, lighting systems, or remote control overhead projectors.

Figure 2:
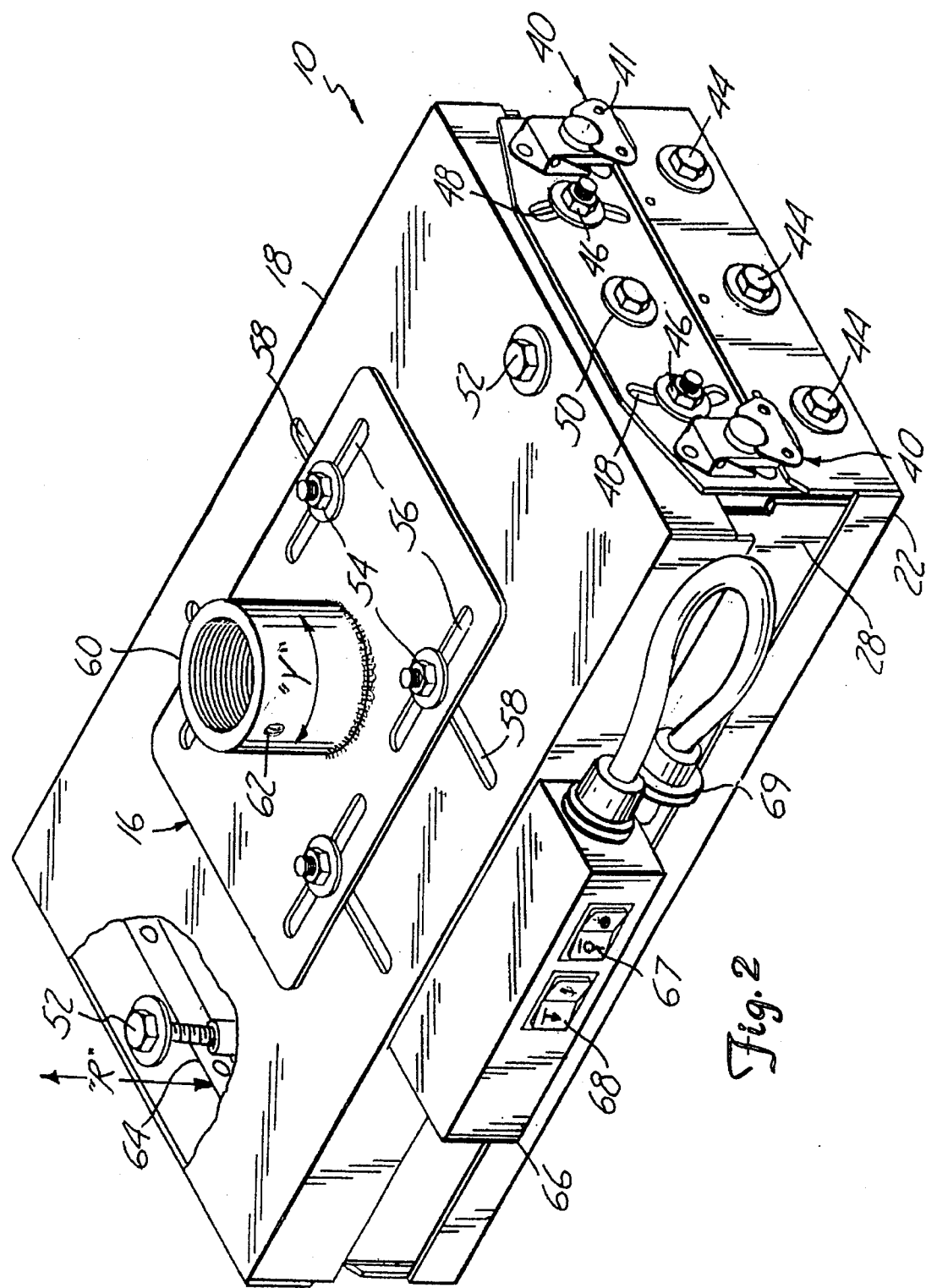
FIG. 2 is a perspective view of a preferred projector lift system in the secured operating position.

FIG. 2 is a perspective view of a preferred projector lift 10 in which the equipment mounting adapter 22 is secured to the housing 28 by a plurality of locking latches 40. In the preferred embodiment, a locking latch 40 is provided on each of the four corners of the housing 28. Electrically actuated latches that can be remotely actuated may be substituted for the latches 40. It will be understood that various configurations and locations of latching mechanisms may be used for securing the equipment mounting adapter 22 to the housing 28, and that the scope of the present invention is not limited to the latches disclosed herein.

The equipment mounting adapter 22 has a plurality of adapter mounting holes 42 (see FIG. 3) for receiving threaded bolts 44 which are used for attaching the audio/visual projector 20 (see FIG. 1). Immediately above the adapter mounting bolts 44 are a pair of pitch adjustment bolts 46 in slotted openings 48. A center pitch adjustment locking bolts 50 assists in retaining the housing 28 at the desired pitch. A substantially identical configuration is present on the opposite side of the projector lift 10 (see FIG. 3).

A pair of roll adjustment bolts 52 are provided in the top of the cover 18 for adjusting the roll "R" of the projector lift 10. The roll adjustment bolts 52 are engaged with a threaded member 64 which is secured to the housing 28 by the pitch locking bolts 50. The roll adjustment is performed by rotating the roll adjustment bolts 52 clockwise or counterclockwise a sufficient amount so that the housing 28 is horizonal.

As discussed above, the center pole mount 16 has a threaded opening 60 for engagement with a threaded pipe 14 mounted to the ceiling 12. The threaded opening 60 permits adjustment of the yaw "Y" of the projector lift 10. A set screw 62 is provided for securing the projector lift 10 relative to the pipe 14 (see also FIG. 1). As discussed above, the adjustment mechanisms for pitch, yaw, and roll all reside in the housing 28. As such, the equipment mounting adaptor 22 may be raised and lowered without disturbing these settings.

Audio/visual projectors are typically focused and centered by physically moving the projector relative to the screen. The center pole mount 16 is attached to the cover 18 by four bolts 54 which extend through slotted openings 56 which allow the projector to be centered on the screen (not shown). The cover 18 has corresponding slots 58 arranged orthogonally to the slots 56 so that the projector 20 can be focused on the screen.

Control box 66 containing a power switch 67 and an up/down switch 68 is mounted to the cover 18. The control box 66 also includes an IEC 320 power inlet (not shown) and a power cord 69 connected to the housing 28.

Figure 3:
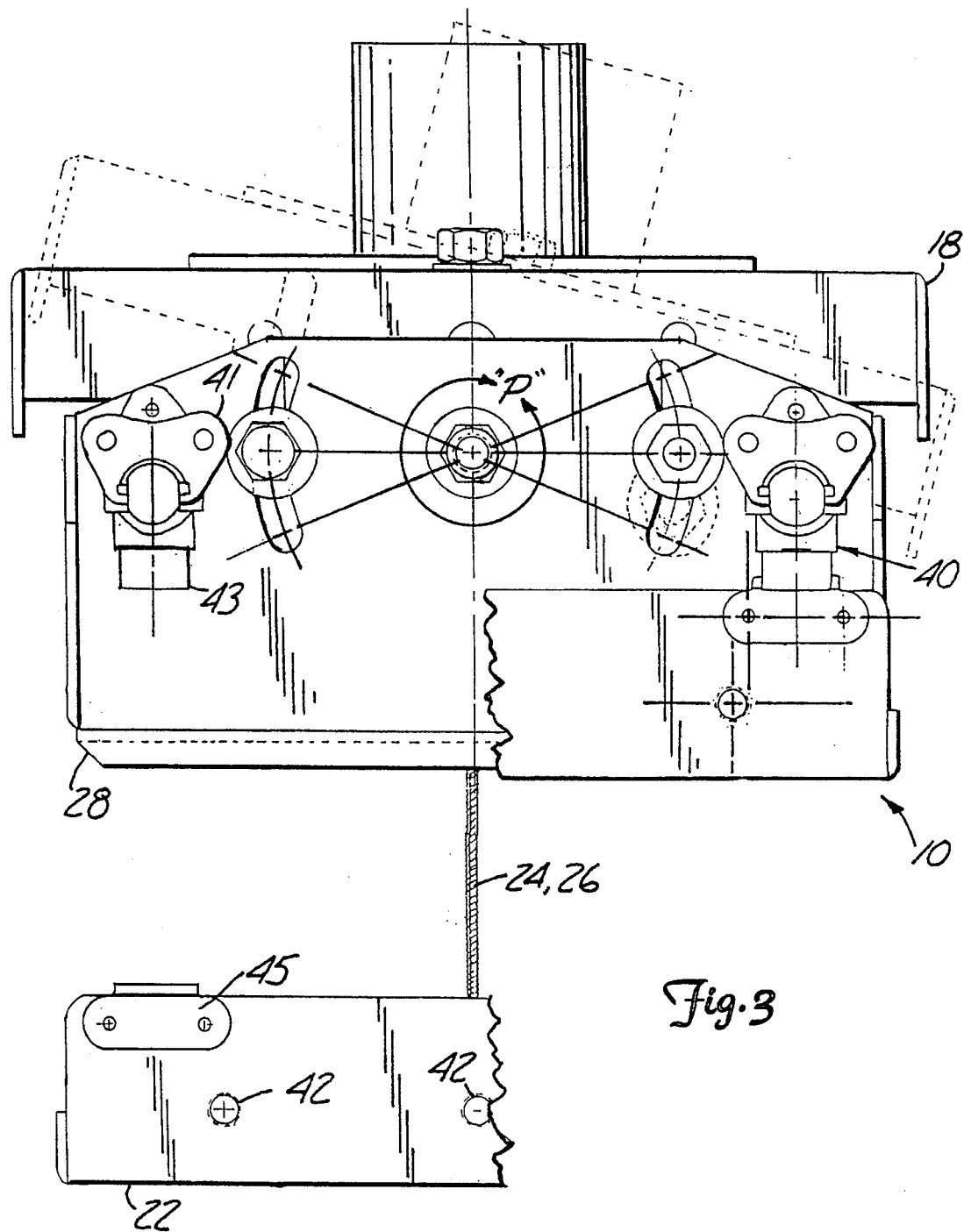
FIG. 3 is a split side view of a preferred projector lift system.

FIG. 3 is a split side view of the projector lift 10 showing a front portion of the equipment mounting adapter 22 in a partially lowered position and a rear portion secured to the housing 28 by the locking latch 40. In a preferred embodiment, the equipment mounting adapter 22 can be lowered up to 20 feet relative to the housing 28. However, it will be understood that the length of cable 24, 26 contained in the lift 10 can be varied depending upon the application. Pitch adjustment "P" of the projector lift 10 is shown in phantom. In a preferred embodiment, the pitch adjustment bolts permit up to 15° of rotation of the housing 28 relative to the cover 18.

As is best seen in FIG. 3, locking latches 40 have a thumb screw portions 41 which are rotated clockwise to draw a latch strap 43 to the latch 40 so that the equipment mounting adaptor 22 is secured to the housing 28. The thumb screw portions are rotated counterclockwise to disengage the latch straps 43 from the mating portion 45. In the preferred embodiment, the latches 40 are spring loaded outward from the housing 28 so that the strap portions 43 do not interfere with the lowering of the equipment mounting adaptor 22.

Figure 4:
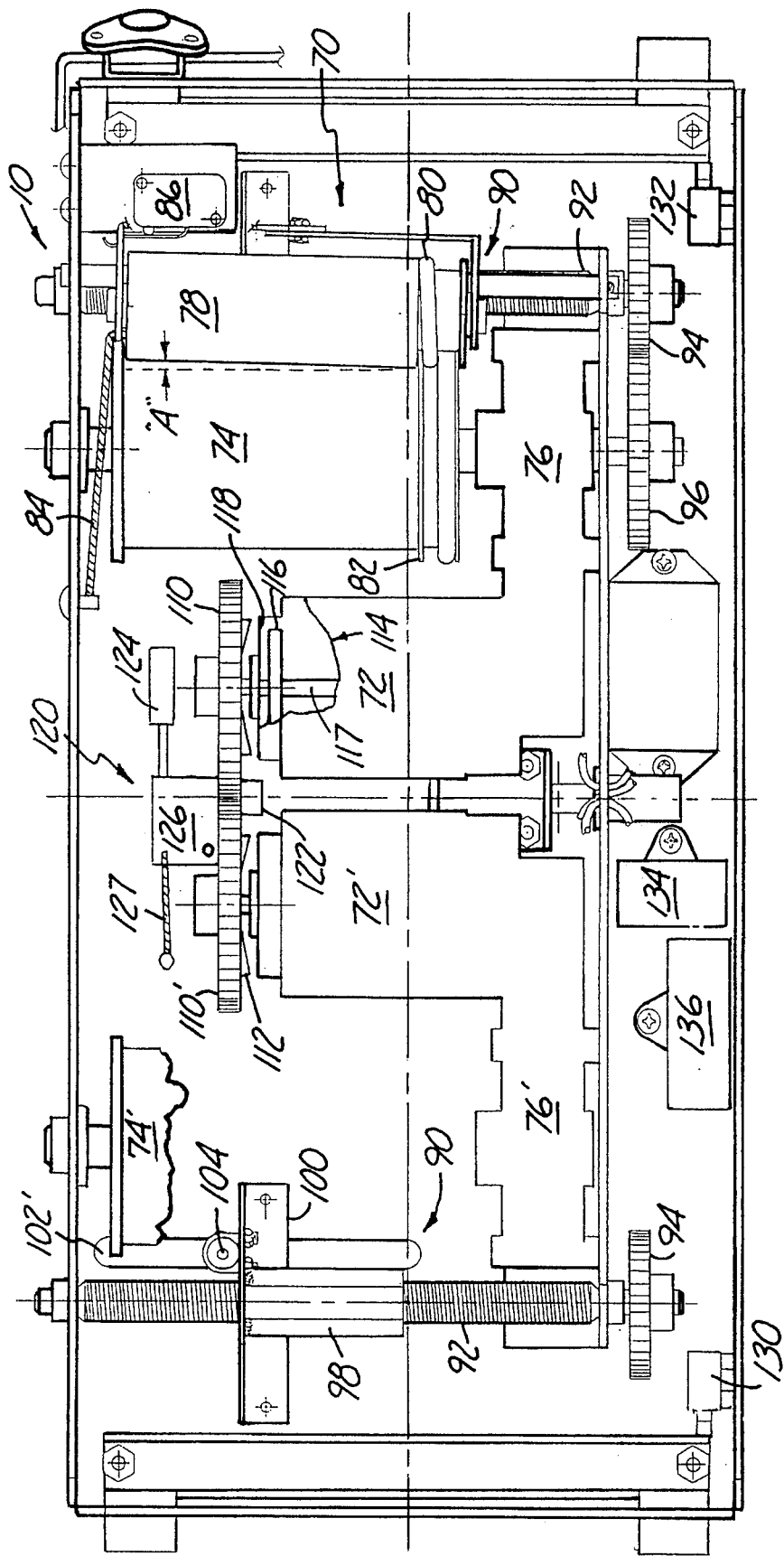
FIG. 4 is a split top view of a preferred motorized winch assembly of the present projector lift system.
Figure 5:
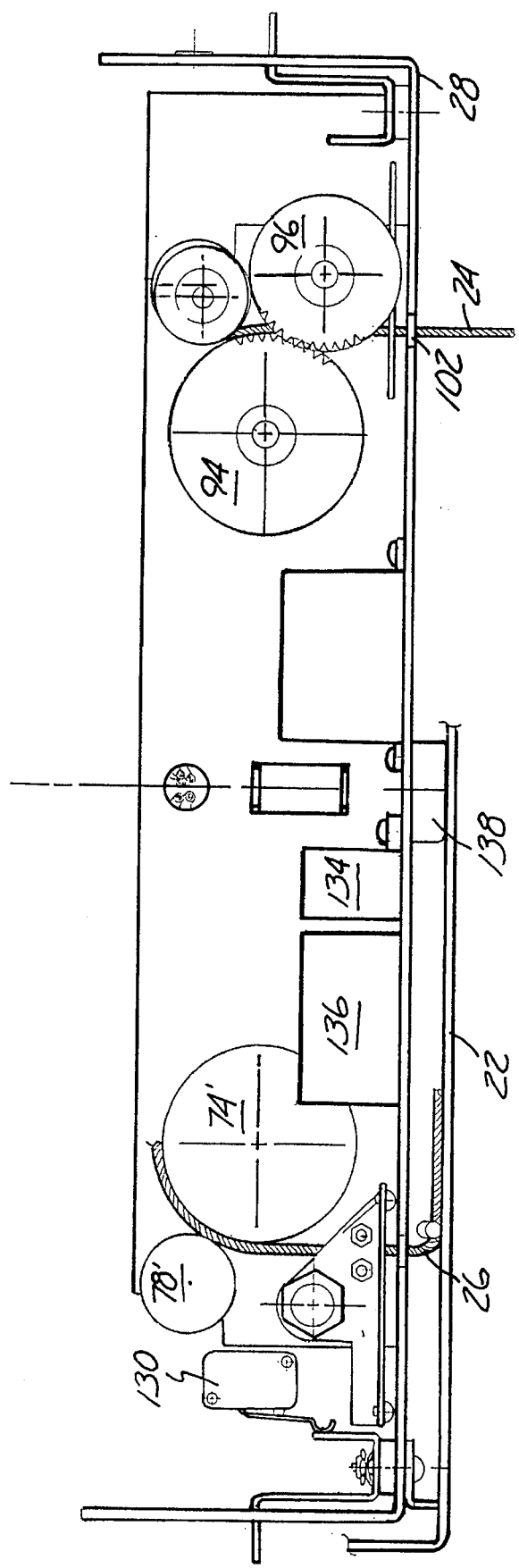
FIG. 5 is a split front view of the motorized winch assembly of FIG. 4.

FIGS. 4 and 5 illustrate a top and front split view of a preferred winch assembly 70, respectively, of the present projector lift 10. As will be clear from the discussion below, the preferred winch assembly 70 includes a pair of redundant winch mechanisms which are mirror images of each other for winding and unwinding the cables 24, 26. However, it will be understood that an alternate embodiment of the present invention may utilize a single motor.

Motors 72, 72' transmit torque to cable cylinders 74, 74' via transmission mechanisms 76, 76'. Floating pinch rollers 78, 78' are positioned at an angle "A" relative to the cable cylinder 74, 74' such that the pinch rollers 78, 78' engage with the first few windings of the cable 24, 26 approximate the location where the cable disengages from the cable cylinders 74, 74'. Maintaining the pinch rollers 78, 78' at the angle "A" applies the maximum force on the first few windings of the cable 24, 26 to maintain adequate tension during the unwinding process.

Urethane belt 80 engages with pulley 82 on each of the cable cylinders 74, 74' to drive the floating pinch rollers 78, 78'. The floating pinch rollers 78, 78' are driven only when the cable is being unwound. Since the pinch rollers 78, 78' have a higher surface feet per minute than the cable cylinders 74, 74', cable 24, 26 is maintained in tension during the unwinding process and any slack in the cables 24, 26 is removed. Maintaining the cable 24, 26 in tension is particularly important when no weight is applied to the cables 24, 26.

However, the urethane belt 80 does not drive the floating pinch rollers 78, 78' when the cable cylinders 74, 74' are winding up the cable. Rather, the floating pinch rollers 78, 78' rotate over the top of the cable 24, 26 to mimic weight on the cables 24, 26 as the cable is being wound onto the cable cylinders 74, 74'. A pinch roller biasing spring 84 is provided on each of the floating pinch rollers 78, 78' to retain the rollers against the cable cylinders 74, 74'. The urethane belt 80 provides additional biasing of the pinch rollers 78, 78'.

Cable guide assemblies 90 are provided for uniformly guiding the cable 24, 26 during the winding and unwinding process. The cable guide assemblies 90 includes threaded cable guide shafts 92 which are coupled to the transmission mechanisms 76, 76' by a pair of sprockets 94, 96. A coupler nut 98 is provided on the cable guide shafts 92. The coupler nut 98 include coupler brackets 100 which traverse a cable drop opening 102, 102' through which the cable 24, 26 extends. A cable guide bushing 104 is provided on each of the coupler bracket 100 to insure uniform winding of the cable relative to the cylinder and to prevent the cable 24, 26 from being damaged as it slides through the coupler bracket 100. A down-stop switch 86 is located proximate the cable guide assemblies 90 to interrupt the flow of current to the motors 72, 72' when the cable 24, 26 is completely unwound.

The motors 72, 72' preferably are synchronized by a pair of sprockets when 110, 110' on the rear portion of the motor 72, 72'. Additionally, the sprockets 110, 110' may include fan blades 112 for cooling the motors 72, 72'. The motors 72, 72' preferably include an internal brake system 114 which minimizes rotation in the event that electric power is terminated during raising or lowering of the projector 20. In a preferred embodiment, the motors 72, 72' include an internal friction plate 116 attached to the motor drive shaft 117 which is biased to engage with an inside surface 118 of the motor housing. When the motors 72, 72' are activated, the inductive force of electric current overcomes the biasing force (not shown) on the motor shaft 117 and disengages the friction plate 116 from the motor housing surface 118, thereby allowing free rotation of the motors 72, 72'. If the electric current,is terminated, the biasing force again moves the friction plate 116 into engagement with the surface 118. A motor with a suitable internal braking system is available from Merkle-Korff Industries, Inc. of Des Plaines, Ill., under model number 189400.

The internal braking mechanism 114 of motor 72, 72' is augmented by external brake assembly 120 having a brake pad 122 which biases sprockets 110, 110' away from the motors 72, 72' to engage the internal brake mechanism 114. The brake pad 122 is mounted to a pivoting lever arm 126. Spring 127 biases brake pad 122 against sprockets 110, 110'. Solenoid 124 is provided for disengaging the brake pad 122 from the sprockets 110, 110' during operation of the winch assembly 70. In the event of a power failure, solenoid 124 returns to the extended position and the brake pad 122 engages with the sprockets 110, 110'.

Micro switch 138 on the bottom of the housing 28 interrupts electrical current to the motors 72, 72' when the equipment mounting adaptor 22 is substantially retracted. A pair of latch/unlatch micro switches 130, 132 are also provided for interrupting electric current to the motors 72, 72' when the equipment mounting adaptor 22 is fully retracted by the locking latches 40. The micro switches 130, 132 prevent the motors 70, 70' from activating when the audio/visual equipment 20 is locked to the housing 28.

A pair of capacitors 134, 136 are provided for powering the motor 72, 72'. In a preferred embodiment, only capacitor 134 is engaged when the winch assembly 70 is unwinding the cables 24, 26 to lower the audio/visual projector 20. However, both capacitors 134, 136 are engaged for powering the motor 72, 72' when the audio/visual equipment 20 is being raised. This configuration is designed to minimize heat generation by the motor 72, 72' during operation of the projector lift 10. One possible combination is for capacitor 134 to have a capacitance of 2 micro farads and capacitor 136 a capacitance of 3 micro farads. Consequently, the motors 74, 74' share 2 micro farads capacitance during lowering and 5 micro farads during raising of the projector 20.

The method of the present invention includes locking mechanisms 40 for rigidly securing the projector 20 to the projector lift system 10 in the operating position. Since the winch assembly is intended primarily for raising and lowering the projector 20 for installation and maintenance, the locking mechanisms will normally be engaged during operation of the projector. As such, the projector 20 is located in the room at all times.

The present invention has now been described with reference to the several embodiments thereof. It will be apparent to those skilled in the art that many changes can be made in the embodiments described without departing from the scope of the invention. Thus, the scope of the present invention should not be limited to the structures described herein, but only by structures described by the language of the claims and the equivalents of those structures.

What is claimed is:

1. A ceiling mounted projector lift system for moving audio/visual equipment between an operating position fixed rigidly to the ceiling and a lowered position, comprising:

a housing rigidly suspended below the ceiling;

a motorized winch assembly mounted in the housing for winding and unwinding a cable;

an equipment mounting member connected to the cable, the mounting member adapted to connect to the audio/visual equipment; and a releasable fastener for rigidly connecting the housing to the equipment mounting member so that the audio/visual equipment is rigidly retainable by the releasable fasteners when in the operating position.

2. The apparatus of claim 1 further including switch means for interrupting power to the motorized winch assembly when the audio/visual equipment is retained in the operating position by the releasable fastener.

3. The apparatus of claim 1 wherein the housing further includes a ceiling pole mount assembly for receiving a threaded pipe attached to the ceiling.

4. The apparatus of claim 1 wherein the housing further includes position adjustment means for adjusting the yaw of the audio/visual equipment relative to the ceiling.

5. The apparatus of claim 1 wherein the housing further includes position adjustment means for adjusting the roll of the audio/visual equipment relative to the ceiling.

6. The apparatus of claim 1 wherein the housing further includes position adjustment means for adjusting the pitch of the audio/visual equipment relative to the ceiling.

7. The apparatus of claim 1 wherein the motorized winch assembly further includes:

an electric motor engaged with at least one cable cylinder; and a pinch roller engaged with the at least one cable cylinder, the pinch roller being driven by the electric motor during unwinding of the cable.

8. The apparatus of claim 7 wherein the pinch roller is disposed at an angle relative to the cable cylinder so that the pinch roller maintains pressure on a leading edge of the cable winding.

9. The apparatus of claim 1 wherein the motorized winch assembly further includes a cable guide assembly for uniformly winding and unwinding the cable on the at least one cable cylinder.

10. The apparatus of claim 9 wherein the cable guide assembly is synchronized with the electric motor.

11. The apparatus of claim 1 wherein the motorized winch assembly comprises:

a first electric motor engaged with a first cable cylinder; and a second electric motor engaged with a second cable cylinder, whereby each electric motor has a capacity sufficient to move the audio/visual equipment between the operating position secured to the ceiling and the lowered position.

12. The apparatus of claim 11 wherein the motorized winch assembly comprises:

first and second pinch rollers engaged with the first and second cable cylinders, the pinch rollers being driven by the first and second electric motors, respectively, during unwinding of the cable; and first and second cable guide assemblies for uniformly winding and unwinding the cable on the first and second cable cylinders.

13. The apparatus of claim 11 wherein the first and second electric motors are synchronized.

14. The apparatus of claim 1 wherein the motorized winch assembly further includes a limit switch for signaling when the unwinding of the cable is complete.

15. The apparatus of claim 7 wherein the electric motor includes an internal brake for preventing motor rotation when electric power is terminated.

16. The apparatus of claim 15 wherein the motorized winch assembly includes an external brake assembly for augmenting the internal brake in the electric motor.

17. The apparatus of claim 1 wherein the equipment mounting member registers the audio/visual equipment to the housing when the releasable fastener is engaged.

18. A ceiling mounted projector lift system for moving audio/visual equipment between an operating position secured to projector lift and a lowered position comprising:

a housing attached to the ceiling;

a motorized winch assembly retained in the housing having at least one cable cylinder for winding and unwinding a cable disposed on the cylinder, the distal end of the cable being connected to the audio/visual equipment;

a locking latch assembly for releasably connecting the housing to the audio/visual equipment so that the equipment is rigidly retained in the operating position; and switch means for interrupting power to the motorized winch assembly when the equipment is retained in the operating position by the locking latch assembly.

19. A ceiling mounted projector lift system for moving audio/visual equipment between an operating position secured to the projector lift and a lowered position comprising:

a housing suspended below the ceiling proximate the operating position;

a motorized winch assembly retained in the housing having at least one cable cylinder for winding and unwinding a cable disposed on the cylinder, the distal end of the cable being connected to the audio/visual equipment;

position adjustment means for adjusting the position of the housing relative to the ceiling; and a locking latch assembly for releasably connecting the housing to the audio/visual equipment so that the audio/visual equipment is rigidly retainable by the releasable fasteners in the operating position.

20. A ceiling mounted projector lift system for moving audio/visual equipment between an operating position fixed rigidly to the ceiling and a lowered position, comprising:

a housing rigidly suspended below the ceiling;

a motorized winch assembly mounted in the housing an electric motor engaged with at least one cable cylinder for winding and unwinding a cable;

first capacitor means having a first capacitance connected to the electric motor for unwinding the cable on the at least one cable cylinder;

second capacitor means having a second capacitance connected to the electric motor in combination with the first capacitor means for winding the cable onto the at least one cable cylinder;

an equipment mounting member connected to the cable, the mounting member adapted to connect to the audio/visual equipment; and a releasable fastener for rigidly connecting the housing to the equipment mounting member so that the equipment is rigidly retained in the operating position.

21. A method for moving audio/visual equipment between a lowered position and an operating position secured to projector lift proximate the ceiling of a room comprising the steps of:

providing a housing containing a motorized winch assembly attached to the ceiling, the winch assembly having at least one cable cylinder for winding and unwinding a cable disposed on the cylinder;

attaching an equipment mounting adaptor to the distal end of the cable;

attaching the audio/visual equipment to the mounting adaptor;

raising the audio/visual equipment to the housing using the winch assembly;

rigidly latching the mounting adaptor to the housing so that the equipment is retained in the operating position; and engaging switch means for interrupting power to the motorized winch assembly when the equipment is retained in the operating position.

22. The method of claim 21 further including the steps of:

disengaging the mounting adaptor from the housing; and lowering the mounting adaptor and audio/visual equipment using the winch assembly.

* * * * *